United States Patent
Leibbrandt et al.

(10) Patent No.: US 8,180,549 B2
(45) Date of Patent: May 15, 2012

(54) METHOD FOR CONTROLLING A CLUTCH

(75) Inventors: Martin Leibbrandt, Bedburg (DE); Harald Schmitz, Dortmund (DE)

(73) Assignee: Getrag Ford Transmissions GmbH, Cologne (DE)

( * ) Notice: Subject to any disclaimer, the term of this patent is extended or adjusted under 35 U.S.C. 154(b) by 715 days.

(21) Appl. No.: 12/274,200

(22) Filed: Nov. 19, 2008

(65) Prior Publication Data

US 2009/0137365 A1    May 28, 2009

(30) Foreign Application Priority Data

Nov. 26, 2007    (DE) .................. 10 2007 057 204

(51) Int. Cl.
*B60T 7/12* (2006.01)
(52) U.S. Cl. .............. 701/87; 701/67; 701/68
(58) Field of Classification Search .......... 701/67–68, 701/87
See application file for complete search history.

(56) References Cited

U.S. PATENT DOCUMENTS

| | | | | |
|---|---|---|---|---|
| 5,738,609 A | * | 4/1998 | Jones et al. | 477/175 |
| 6,951,528 B2 | * | 10/2005 | Ewinger et al. | 477/195 |
| 7,206,683 B2 | * | 4/2007 | Billig | 701/69 |
| 2008/0064561 A1 | * | 3/2008 | Popp et al. | 477/5 |
| 2009/0131223 A1 | * | 5/2009 | Kulbe | 477/176 |

FOREIGN PATENT DOCUMENTS

| | | |
|---|---|---|
| DE | 44 09 122 | 2/1995 |
| DE | 197 16 828 | 11/1997 |
| DE | 102 30 611 | 1/2003 |

\* cited by examiner

*Primary Examiner* — Hussein A. Elchanti
(74) *Attorney, Agent, or Firm* — Schlee IP International, P.C.; Alexander R. Schlee

(57) ABSTRACT

A method of controlling a clutch in a motor vehicle and a motor vehicle adapted to perform this method are suggested, in particular resulting in a good starting phase action for supercharged diesel motors. The method comprises the method steps of: setting a clutch torque that is transmitted by a clutch by a plurality of clutch characteristics; determining by a respective clutch characteristic the clutch torque for a particular motor load depending on the rotational speed of the motor; dividing the clutch characteristics into a low speed range and into a full load range; increasing within the low speed range at a constant rotational speed of the motor the transmitted clutch torque with increasing the motor load; and transmitting in the full load range in comparison to the low speed range lower clutch torques at the same rotational speed of the motor.

20 Claims, 3 Drawing Sheets

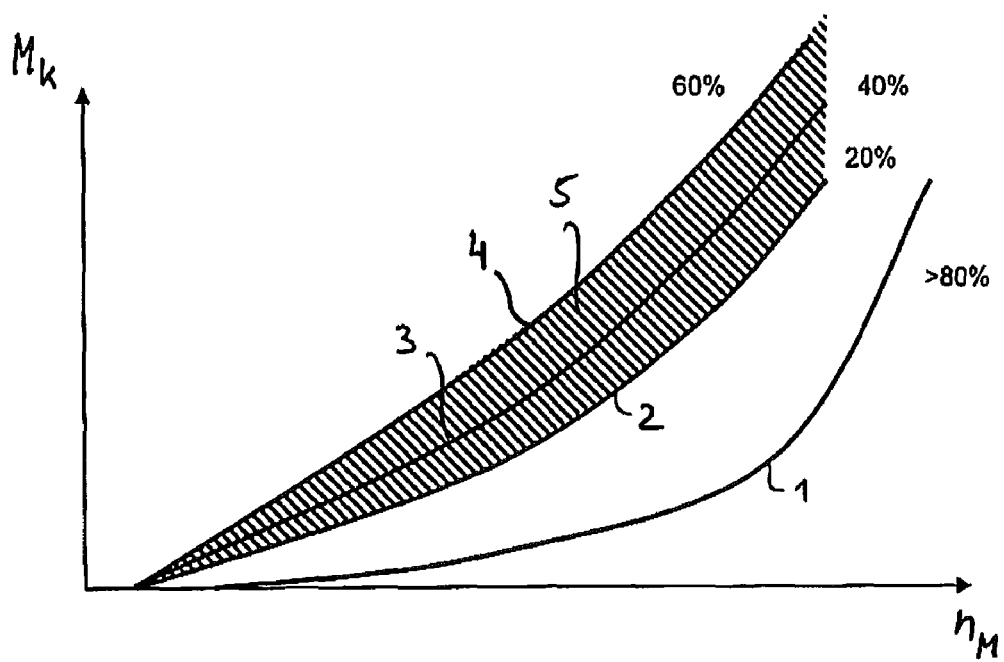
Figur 1
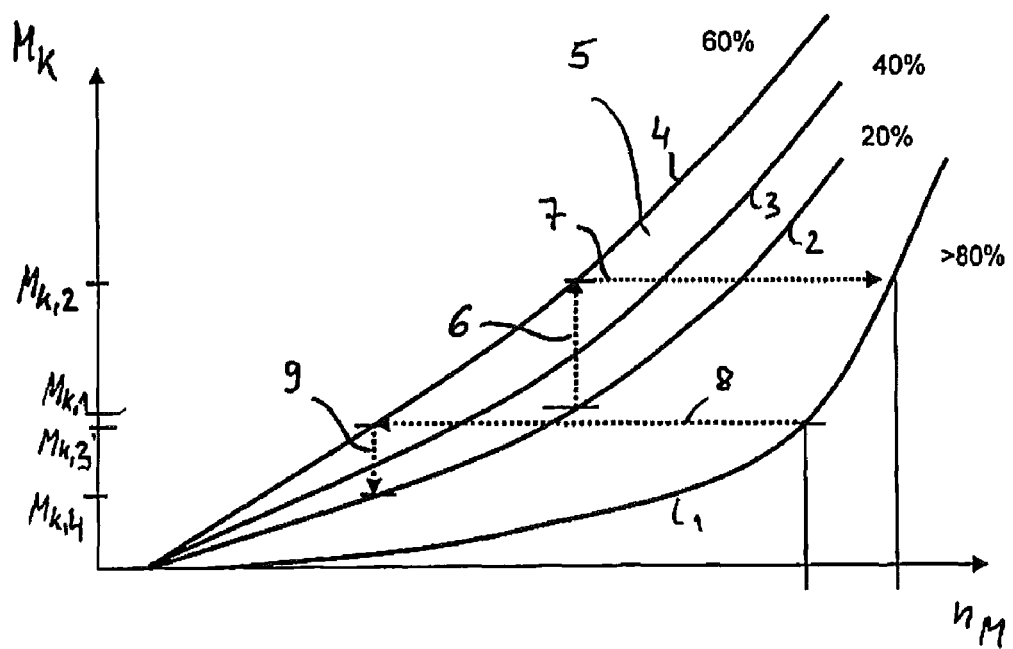
Figur 2

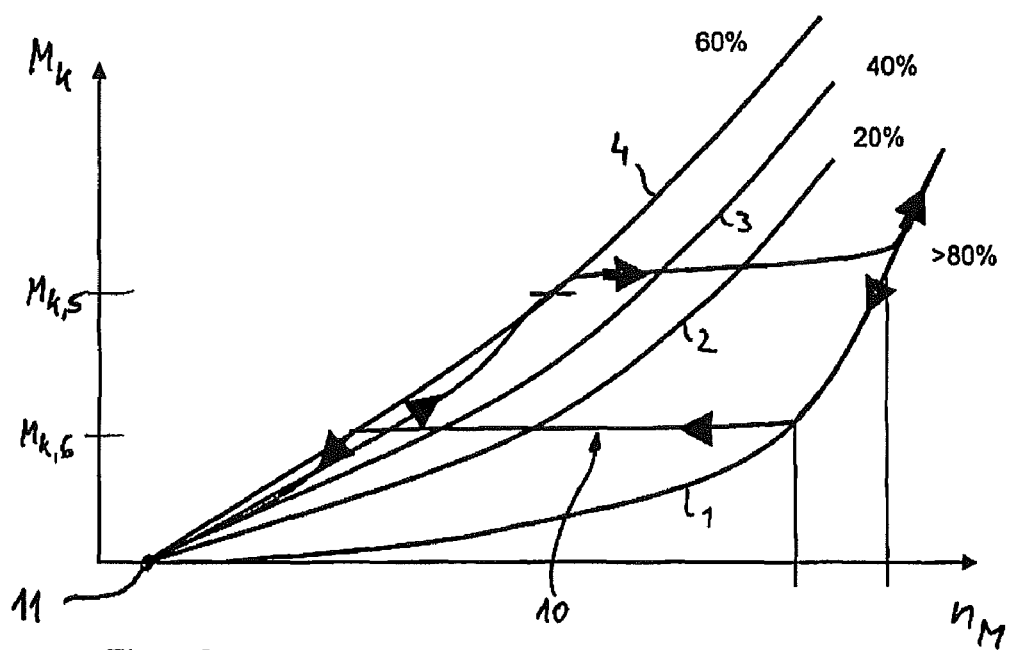
Figur 3
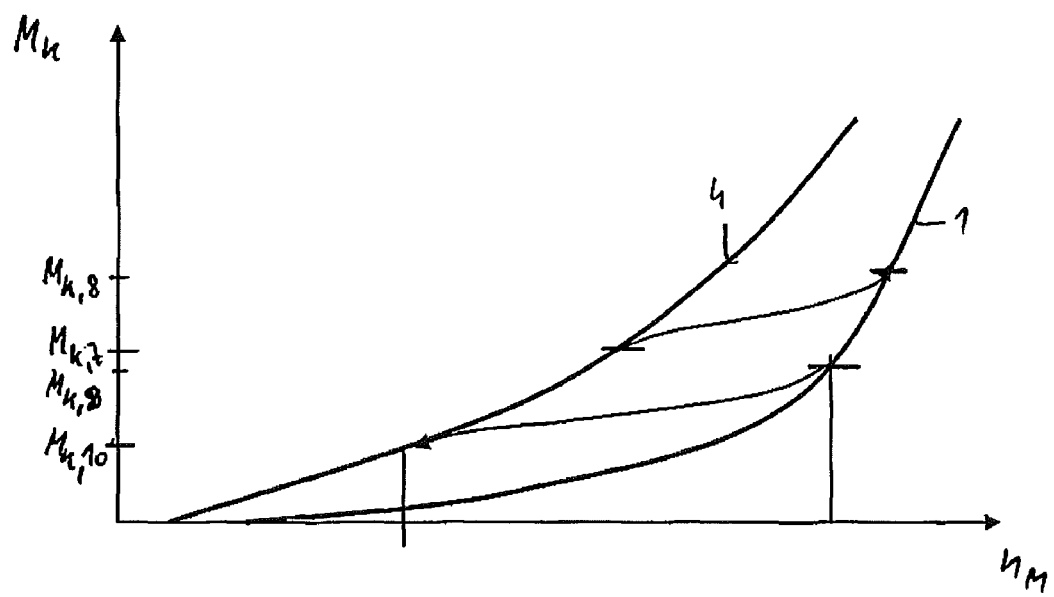
Figur 4

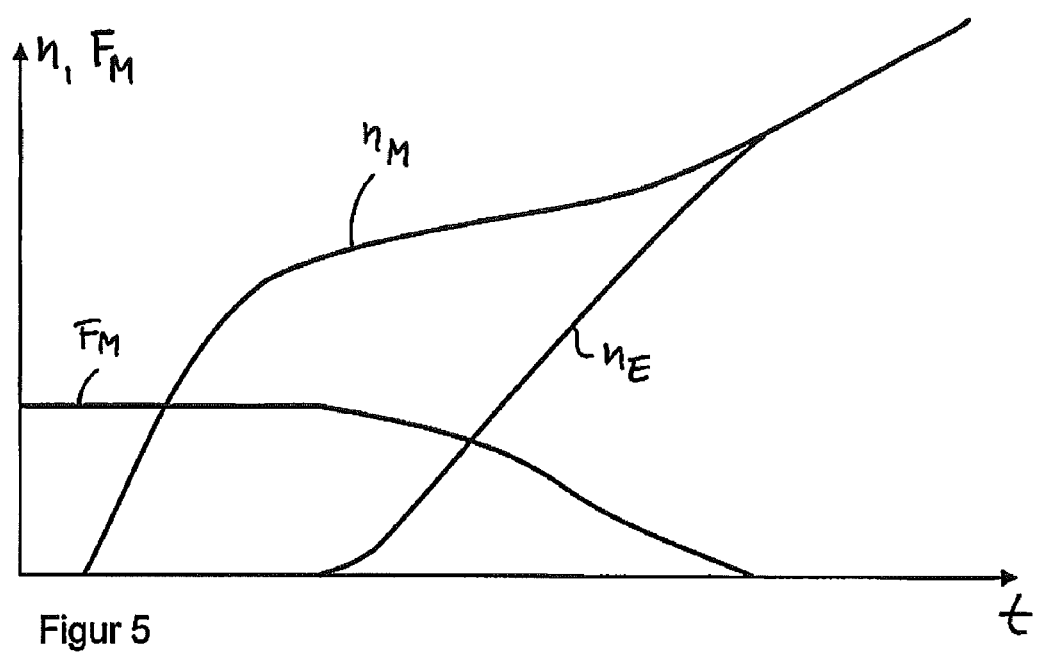
Figur 5

METHOD FOR CONTROLLING A CLUTCH

CROSS REFERENCE TO RELATED APPLICATION

This application claims the priority right from the German patent application DE 102007057204.4 that was filed on Nov. 26, 2007, the content of which is herewith incorporated in its entirety by reference.

BACKGROUND OF THE INVENTION

The invention relates to a method for controlling a clutch, in particular of a frictional clutch in a motor vehicle. Goal of this method is in particular to modulate the clutch torque that is transmitted during a starting process of the vehicle for making this starting process as comfortable as possible and to control it in a manner as desired by the driver.

In vehicles that are powered by a motor and have an automated transmission, it is common to use frictional clutches as starting components. Compared to for example torque converters in conventional automatic transmissions such clutches have the advantage that the clutch torques that are transmitted within the motor limits can be modulated almost entirely as desired.

In particular in the starting phase of a vehicle powered by a motor torque (a motor vehicle) high requirements apply to the control of a clutch for providing a starting phase that can be readily controlled, wherein a low speed low load range on the one hand like in case of parking and a high-power full load starting phase on the other hand have to be provided. The DE 197 168 28 introduces for this purpose various control methods that are described as generally possible controls. For example, it is disclosed that during the starting phase the transmitted clutch torque can be a function of the rotational speed of the motor.

In the DE 44 091 22 A1 it is suggested that the starting phase characteristic can depend on a pedal value since the starting phase rotational speed at the starting phase can be adjusted depending on that pedal value. Starting from this starting rotational speed the starting process is performed by controlling the slippage based on a target slippage characteristic. It is further disclosed that the control can also depend on the pedal position. However, the suggested pedal change is restricted to 30% since above this value the starting phase action is started anew or is terminated.

In the DE 102 306 11 A1 a method is disclosed where the starting phase characteristics differ from each other according to the chosen gear. In addition, the clutch torque that is transmitted by the clutch can be adjusted by a plurality of clutch characteristics, wherein one clutch characteristics sets the torque that can be transmitted at a particular motor load depending on the rotational speed of the motor. For this purpose, a standard clutch characteristic is provided that is then multiplied by a factor depending on a throttle valve angle, i.e. depends on the applied motor load. The factor is a linear function of the throttle flap angle that apart from constant values in the starting phase and the end phase decreases consistently. Therefore, the clutch torque decreases with larger throttle angle positions.

The DE 102 306 11 A1 suggests to introduce a factor that depends on time and influences the pre-existing characteristic that is determined by the standard clutch characteristic and the factor as described above. If during a starting phase action the throttle flap position changes, a change between clutch characteristics is conducted that differs depending on the factor that depends on throttle valve angle, wherein the signal from the throttle flap position is subjected to a strong filtering with long time constants.

The method according to the three documents as discussed above is only limited to starting phase characteristics, particularly in connection with supercharged diesel engines. Diesel engines often have an aggressive characteristic. This means, a strong torque increase takes place already at small gas pedal changes.

In addition, it is a desirable to achieve a starting phase with low pedal values and low rotational speed since higher rotational speeds result in undesired noise. Since also diesel engines develop their maximum torque at higher rotational speeds (>1600 rpm), for a full load starting action, the rotational speed of the motor has be controlled to a high value.

SUMMARY OF THE INVENTION

It is an object of the invention to create a method for controlling a clutch that results in particular in case of motor vehicles comprising supercharged diesel engines in a good starting phase characteristic.

In the method according to the invention, the clutch characteristics are divided into a low speed range and into a full load range, wherein within the low speed range at a constant rotational speed of the motor the transmitted clutch torque increases while increasing the motor load and wherein in the full load range in comparison to the low speed range lower clutch torques are transmitted at the same rotational speed of the motor. Preferably, the motor load can be derived from other parameters. For example, this can be a throttle valve flap position or a gas pedal position (in the following in short: pedal value).

This means that during the starting phase action the clutch torque is controlled depending on the rotational speed of the motor. For this purpose, the clutch torque increases preferably in a linear fashion or progressively (more than proportional) with increasing rotational speed of the motor. For various motor loads, or as far as the motor load is derived from other parameters, for various gas pedal values, different clutch characteristics are implemented that are divided into the low speed, low load range and the aforementioned full load range. In the low speed and low load range higher motor loads or pedal values at the same rotational speed of the motor result directly in increasing clutch torques. In the full load range the clutch torques that can be transmitted via the clutch are at the same rotational speed preferably significantly lower as in the low speed range.

In the low speed range and/or the full load range between two adjacent clutch characteristics the transmitted clutch torque can be interpolated. This achieves, within a range in case of a change of the motor load, a continuous change of the clutch torque without any steep increases. For example, in the full load range, the transmitted clutch torque would also increase with increasing motor load if like for the low speed range several clutch characteristics are stored.

The vehicle reaction is in line with the expectations of the driver since in the low speed range with increasing pedal value (that correlates directly to the motor torque that is desired by the driver) also the clutch torque that is transmitted by the clutch increases: If the pedal value is increased, also the acceleration is higher. If the pedal value is decreased, also the acceleration is decreased. In case of a single clutch characteristic the direct connection between pedal value and acceleration would not exist. In this case, the rotationally inert mass of the motor would have to be accelerated first for providing via the increased rotational speed a higher clutch torque and therefore a higher acceleration of the vehicle. Therefore, a more spontaneous reaction of the vehicle to pedal value changes is provided according to the invention that results in that the vehicle is easier to control.

In addition, the increased clutch torque puts a higher load on the motor that results in that the motor rotational speed does not increase as much as if only one clutch characteristic is provided. This satisfies the wish to have lower starting action rotational speeds in the low speed range. However, for providing also the maximum motor torque, it is necessary to operate the motor at higher rotational speeds. For achieving this, the clutch characteristics of the full load range provides lower torques as the clutch characteristics for the low speed range. This is required for providing sufficient torque reserve for the self-acceleration.

According to a preferred embodiment, a change from the low speed range to the full load range is conducted when due to an increasing motor load a first threshold value for the motor load is exceeded wherein during that change from the low speed range into the full load range the clutch torque is at least approximately maintained constant. In this case, for the change, such a value can be set that follows from the clutch characteristic in the low speed range for that motor load that follows from the first threshold value. This is the clutch torque immediately prior to the change so that no steep change of the clutch torque occurs.

In addition, a change from the full load range to the low speed range can be conducted when due to a decreasing motor load the motor load falls below a second motor load threshold value wherein during the change from the full load range to the low speed range the clutch torque is maintained at least approximately constant. For that at least approximately constant clutch torque such a clutch torque can be set that follows from the clutch characteristic in the full load range for that motor load that equals to the second threshold value or comes closest to that second threshold of value. Also in this case, abrupt changes in the clutch torque are prevented.

A simple change between ranges by a change switch actuated according to a motor load or a pedal position would result in unexpected driving reactions since such switching would happen at approximately constant rotational speed of the motor. This would result in that during a change from the low speed range to the full load range (i.e. with increasing pedal values) the vehicle acceleration in the low speed range would first increase during that low speed range, and then suddenly drop when the change into the full load range happens. Vice versa, when a change from the full load range into the low speed range is taking place at a decreasing motor load or a decrease in pedal values the vehicle acceleration would increase by means of the then increasing clutch torque abruptly to a high value and subsequently drop again within the low speed range.

For avoiding this, according to the embodiments described above during a change the torque transmitted by the clutch is held approximately constant until the change of the rotational speed of the motor is established through the change of the motor load or the pedal value and the new point of operation has been established on the new clutch characteristic. In this connection, at first during an increase in the pedal value from 0 to 100% an acceleration results until the motor load or the pedal value have reached the first threshold value where a change is conducted. The continuous increase in the clutch torque is followed by a phase of constant clutch torque and therefore a constant vehicle acceleration wherein during this phase the rotational speed of the motor increases. If during constant clutch torque and increasing rotational speed of the motor the full load range has been reached, according to the prestored clutch characteristic for the full load range the clutch torque increases with increasing rotational speed of the motor and therefore the acceleration increases. Vice versa, in case of a decrease of the pedal value from 100% to 0% at first the vehicle acceleration decreases with a decreasing rotational speed of the motor while then during the change from the full load range to the low speed range is kept constant, wherein the rotational speed of the motor decreases further and then decreases even further within the low speed range.

In the most simple case, the clutch torque can be formed by a minimum/maximum-choice during the change between the two ranges, wherein during the change from the low speed range to the full load range the maximum clutch torque is chosen, while during the change from the full load range to the low speed range the minimum torque is chosen.

The first threshold value can correlate to 80% of the full motor load, maximum pedal position or maximum throttle flap position. The second threshold value can be a value of 60% of the full motor load or of a respective parameter. The difference between the two threshold values can also assume a different value, for instance 30%.

According to a preferred embodiment only one clutch characteristic is provided for the full load range. This clutch characteristic is taken as a basis when after a change from the low speed range into the full motor load range, the motor load is for example higher than 80% of the full motor load.

The clutch torque that it is at least approximately maintained constant can be modified at a change between the low speed range and the full load range by a factor that depends on time, the rotational speed and/or the slippage. This smoothens the clutch torque during a change of the clutch torque according to a clutch characteristic to the clutch torque that is kept constant during this change between two ranges for acquiring a more continuous driving sensation. However, this measure increases the duration of the change phase.

By means of a factor depending on the slippage a more smooth approaching of the rotational speed of the motor to the rotational speed of the input shaft of a transmission that is connected behind the clutch can be achieved.

The calculated clutch torque can be modified during the entire starting phase by a factor that depends on a slippage, said factor reducing the clutch torque when the slippage value decreases. This additional factor depending on the slippage may reduce the clutch torque by up to 50% of the clutch torque that follows from the clutch characteristic.

Therefore, according to the invention, a method is suggested wherein the clutch torque that is transmitted is determined by several discrete clutch characteristics. The clutch characteristics depend on the rotational speed of the motor and are chosen according to the motor load that is for instance derived from the gas pedal position and is in line with the intent of the driver. Between the clutch characteristics within one range (slow speed range or full load range) the clutch torque is determined by interpolation between the clutch characteristics. When changing between the two ranges, the clutch torque is kept substantially constant so that even in case of abruptly changing motor loads the driver does not experience any unexpected effects.

BRIEF DESCRIPTION OF THE DRAWINGS

By referring to the drawings, the invention is discussed in more detail in the following. In the drawings show:

FIG. 1 clutch characteristics for a preferred embodiment;

FIG. 2 the change between two clutch characteristics illustrating different ranges;

FIG. 3 a torque path in case of a short-term full operation of a gas pedal;

FIG. 4 a modified transitory function for a change between two clutch characteristics belonging to different ranges; and FIG. 5 characteristics illustrating the starting process in case of a modification by a torque factor.

DETAILED DESCRIPTION OF THE DRAWINGS

FIG. 1 shows several clutch characteristics 1-4 demonstrating the function of a clutch torque $M_K$ over the rotational speed $n_M$ for a variety of motor loads. For example, the clutch characteristics 2 illustrates the clutch torque $M_K$ when the driver of the motor vehicle to that the method according to the invention is applied has chosen via the gas pedal a motor load of 20% of the maximum motor load. The clutch characteristics 2, 3, 4 form a low speed range 5 that is illustrated in FIG. 1 by the hachured area. It is shown that within this low speed range 5 at a constant rotational speed $n_M$ of the motor the clutch torque $M_K$ increases with an increasing of the motor load.

The clutch characteristics 1 demonstrates the full load range demonstrating that the transmitted clutch torque $M_K$ depends on the rotational speed $n_M$ of the motor torque when the motor load is 80% or higher compared to the full motor load. This demonstrates clearly that at the same rotational speed of the motor $n_M$ the clutch characteristics 1 provides less clutch torque $M_K$ as in case of the clutch characteristics 2, 3, 4 of the low speed range 5.

FIG. 2 shows by means of the arrows at the dotted lines a change between the clutch characteristics 1, 2, 3, 4 when the motor load increases from 20% during the starting process to 80% of the full motor load. At the beginning of this increase, the clutch torque equals to a starting torque $M_{K,1}$. During the increase to 80% of the full motor load the clutch torque passes first through the entire low speed range 5 until at a constant motor rotational speed, demonstrated by the vertical arrows 6, the clutch characteristic 4 is reached. The torque that is transmitted at this point is $M_{K,2}$. This value $M_{K,2}$ is provided until through increase of the motor load to 80% a change from the low speed range 5 of the clutch characteristics to the full load range (full load characteristics) is initiated. At this change or transition, the clutch torque is kept constant at the value $M_{K,2}$, wherein by means of an increase in motor load the motor is accelerated, that being reflected by an increase in the motor rotational speed. The clutch torque is thereby held constant (compare arrow 7) until the full load characteristic I is reached. Thereafter, the clutch torque increases further with increasing rotational speeds of the motor according to clutch characteristics 1.

The arrows 8 and 9 demonstrate a change from the full load range to the low speed range. If the motor load decreases below a second threshold value that, according to the embodiments shown in FIG. 2 is 60% of the full motor load, a change from the full load range to a slow speed range 5 is initiated, and the clutch torque is kept constant at a value $M_{K,3}$ in said slow speed range even if the rotational speed of the motor (compare arrow 8) is decreasing. The clutch torque is kept constant until the clutch characteristic 4 has been reached. Thereafter, at a constant rotational speed of the motor (arrow 9) within the slow speed range the torque is reduced to a value $M_{K,4}$.

FIG. 3 shows a graph 10 of a clutch torque $M_K$ when activating the gas pedal by a short-term, entire kick down, resulting in a short-termed increase of the motor load to 100%. Starting from a zero point 11 from that all clutch characteristics 2, 3, 4 in the low speed range 5 start, the clutch torque increases to the value $M_{K,5}$. It can be noticed that a starting from the zero point 11 by means of an increase in the motor load the motor rotational speed $n_M$ increases. This increase of the motor rotational speed can be explained in that the increase of the motor load takes some time, resulting in an acceleration of the motor (this effect is not shown in FIG. 2). When reaching a motor load of 60% of the full motor load a change to the full motor load is initiated, wherein the during this change a constant clutch torque is held at the level $M_{K,5}$. When reaching the full load characteristic 1 the clutch torque increases according to the full load characteristic 1 wherein the motor and therefore the vehicle accelerate further. Since the gas pedal is actuated only briefly and the gas pedal value decreases again after reaching the maximum value, the transmitted clutch torque $M_K$ and the motor rotational speed $n_M$ are decreasing according to full load characteristic until a change to the low speed range 5 is initiated, that being characterized by constant clutch torque at the level of the value $M_{K,6}$. After reaching the clutch characteristics 4, the clutch torque is reduced until the zero point 11 is reached again.

FIG. 4 shows a modification of this method wherein the clutch torque is modified at a change from one range to another by additional parameters such as time or rotational speed so that the approximately constant clutch torque comprises a low increase. At a change from the clutch characteristic 4 to the clutch characteristic 1 the torque increases from a value $M_{K,7}$ to a value $M_{K,8}$ for providing a more constant driving feeling. In contrast, at a change from a full load characteristic 1 to a clutch characteristic 4 the clutch torque decreases from a value $M_{K,9}$ to a value $M_{K,10}$.

An example for a factor depending on the slippage, wherein the clutch torque can be influenced by this factor during the starting process, is shown in FIG. 5. There, a torque factor $F_M$ is shown over a time t, depending on the rotational speed difference or the slippage between the motor rotational speed $n_M$ and an input shaft rotational speed $n_E$ at an input shaft of the transmission. With a decreasing slippage, the input torque factor $F_M$ decreases, so that a smooth approaching of the motor rotational speed $n_M$ to the input shaft rotational speed $n_E$ is possible.

List of Reference Numerals
1 clutch characteristic
1 clutch characteristic
1 clutch characteristic
1 clutch characteristic
5 low speed range
6 arrow
7 arrow
8 arrow
9 arrow
10 graph
11 zero point
$M_K$ clutch torque ($M_{K,1}$, $M_{K,2}$, . . . )
$n_M$ motor rotational speed
$n_E$ rotational speed at an input shaft of a transmission
$F_M$ torque factor

The invention claimed is:

1. A method of controlling a clutch in a motor vehicle, comprising the method steps of:
  setting by a plurality of clutch characteristics for different motor loads a transmitted clutch torque that is transmitted by a clutch depending on the rotational speed of the motor;
  dividing the clutch characteristics into a low speed range and into a full load range and selecting depending on the motor load a selected clutch characteristic from the plurality of clutch characteristics;

determining from the selected clutch characteristic the transmitted clutch torque for a particular motor load depending on the rotational speed of the motor;

increasing within the low speed range at a constant rotational speed of the motor the transmitted clutch torque with increasing the motor load; and transmitting in the full load range in comparison to the low speed range lower transmitted clutch torques at the same rotational speed of the motor.

2. The method according to claim 1, further comprising the method step of determining the motor load by a throttle valve position or by a gas pedal position.

3. The method according to claim 1, further comprising the method step of interpolating the transmitted clutch torque within at least one of the low speed range and the full load range between two adjacent clutch characteristics.

4. The method according to claim 1, further comprising the method steps of changing from the low speed range to the full load range when due to an increasing motor load a first threshold value for the motor load is exceeded; and maintaining the clutch torque constant during that change from the low speed range into the full load range.

5. The method according to claim 4, further comprising the method step of setting the clutch torque for the maintained constant clutch torque during a change from the low speed range to the full load range according to a clutch characteristic in the low speed range for the motor load that equals to the first threshold value.

6. The method according to claim 1, further comprising the method steps of changing from the full load range to the low speed range when due to a decreasing motor load the motor load falls below a second motor load threshold value; and maintaining the clutch torque constant during the change from the full load range to the low speed range.

7. The method according to claim 6, further comprising the method step of setting the clutch torque for the maintained constant clutch torque during a change from the full load range to the low speed range according to a clutch characteristic in the full load range for the motor load that equals to the second threshold value.

8. The method according to claim 5, wherein the first threshold value is 80% of the full motor load.

9. The method according to claim 6, wherein the second threshold value is 60% of the full motor load.

10. The method according to claim 7, wherein the second threshold value is 60% of the full motor load.

11. The method according to claim 1, further comprising the method step of providing only one clutch characteristic in the full load range.

12. The method according to claim 1, further comprising the method step of modifying the maintained constant clutch torque at a change between the low speed range and the full load range by a factor that depends on at least one of the parameters time, rotational speed and slippage.

13. The method according to claim 1, further comprising the method steps of modifying the calculated clutch torque during the entire starting phase by a factor that depends on a slippage, wherein said factor reduces the clutch torque with decreasing slippage.

14. The method according to claim 13, further comprising the method step of determining the factor depending on the slippage also by a characteristic field depending on the motor load.

15. The method according to claim 13, further comprising the method step of reducing the clutch torque by up to 50% of the clutch characteristic value by the factor depending on slippage.

16. The method according to claim 14, further comprising the method step of reducing the clutch torque by up to 50% of the clutch characteristic value by the factor depending on slippage.

17. The motor vehicle according to claim 1, wherein the control is programmed such that a change from the low speed range to the full load range is conducted when due to an increasing motor load a first threshold value for the motor load is exceeded wherein during that change from the low speed range into the full load range the clutch torque is maintained constant.

18. The motor vehicle according to claim 17, wherein during a change from the low speed range to the full load range for the maintained constant clutch torque the control is programmed such that a clutch torque is set that follows from the clutch characteristic in the low speed range for the motor load that equals to the first threshold value.

19. The motor vehicle according claim 1, wherein the control is programmed such that a change from the full load range to the low speed range is conducted when due to a decreasing motor load the motor load falls below a second motor load threshold value wherein during the change from the full load range to the low speed range the clutch torque is maintained constant.

20. A motor vehicle, comprising
a motor adapted to rotate at various rotational speed;
a clutch adapted to transmit a clutch torque; and
a control controlling the clutch and having a control memory; wherein
plurality of clutch characteristics are stored in the control memory, said characteristics determining the clutch torque for a particular motor load depending on the rotational speed of the motor; and
said characteristics being divided into a low speed range and into a full load range, wherein the control is designed such that within the low speed range at a constant rotational speed of the motor the transmitted clutch torque increases with increasing the motor load and wherein in the full load range in comparison to the low speed range lower transmitted clutch torques are transmitted at the same rotational speed of the motor.

* * * * *